(12) United States Patent
Rhoads

(10) Patent No.: US 6,377,022 B1
(45) Date of Patent: Apr. 23, 2002

(54) RECHARGEABLE COFFEE BEAN AND SPICE MILL

(76) Inventor: Theodore Rhoads, 6050 Tally Ho, Cave Creek, AZ (US) 85331

( * ) Notice: Subject to any disclaimer, the term of this patent is extended or adjusted under 35 U.S.C. 154(b) by 0 days.

(21) Appl. No.: 09/722,180

(22) Filed: Nov. 27, 2000

Related U.S. Application Data

(63) Continuation-in-part of application No. 09/556,400, filed on Apr. 24, 2000, now Pat. No. 6,181,104.

(51) Int. Cl.⁷ .................................................. H02J 7/00
(52) U.S. Cl. ........................................ 320/115; 320/114
(58) Field of Search ................................ 320/115, 114, 320/110, 111; 241/48, 69, 93, 100, 169.1

(56) References Cited

U.S. PATENT DOCUMENTS

| | | | | |
|---|---|---|---|---|
| 3,596,018 A | * | 7/1971 | Elmes ........................ | 320/109 |
| 3,734,417 A | * | 5/1973 | Russell et al. .............. | 241/168 |
| 4,101,082 A | | 7/1978 | Mayer et al. ................ | 473/495 |
| 4,225,814 A | | 9/1980 | Gantz et al. ................ | 320/115 |
| 4,405,890 A | * | 9/1983 | Hicks, Jr. ................... | 320/114 |
| 4,469,283 A | | 9/1984 | Noguchi et al. ............. | 241/48 |
| 4,925,150 A | | 5/1990 | Tedioli ...................... | 241/169.1 |
| 5,022,591 A | | 6/1991 | Sanders .................... | 241/169.1 |
| 5,075,615 A | | 12/1991 | Dantis ....................... | 320/111 |
| 5,172,868 A | | 12/1992 | Midden ...................... | 241/246 |
| 5,201,474 A | | 4/1993 | Midden ...................... | 241/100 |
| 5,458,295 A | | 10/1995 | Haber et al. ............... | 241/100 |
| 5,865,384 A | | 2/1999 | Pai ............................ | 241/93 |
| 6,181,104 B1 | * | 1/2001 | Rhoads ...................... | 320/114 |

* cited by examiner

Primary Examiner—Peter S. Wong
Assistant Examiner—Lawrence Luk
(74) Attorney, Agent, or Firm—Sherman D. Pernia

(57) ABSTRACT

A rechargeable coffee or spice grinding apparatus having a grinder and a charging station. The grinder is hand portable and useable separated from the charging station. The grinder has a power supply (e.g., a battery pack) that is recharged by a current induced in the grinder's charging circuit by the inductance probe of the charging station. The charging station is cordless and plugs directly into a household wall outlet. The charging station has an inductively coupled charging probe that mates with a probe receptacle in the grinder. The charging probe induces an electrical current in the charging circuit of the grinder without any wires or direct electrical contact between the grinder to the charging station. The grinder's charging circuit connects to the rechargeable power supply and provides the electricity to operate the grinder motor. This motor is used to spin chopping blades or a burr grinder to comminute solid particulate foodstuff (such as coffee beans or spices like peppercorns) placed in the basket of the grinder. An opening on the bottom of the grinder serves as an induction receptacle for receiving the charging probe and is in electrical communication with the grinder's charging circuit. The charging station normally is supported on a flat horizontal surface, like a kitchen counter, and has a vertical component with a vertically adjustable portion having a plug end. The height of the plug may be vertically adjustable to accommodate wall plug outlets located at different heights above the kitchen counter.

13 Claims, 3 Drawing Sheets

RECHARGEABLE COFFEE BEAN AND SPICE MILL

The present application is a CIP of prior filed U.S. patent application, Ser. No. 09/556,400 filed Apr. 24, 2000 now U.S. Pat. No. 6,181,104 to which the present application is a regular U.S. national application, and which is incorporated herein by reference in its entirety.

FIELD OF THE INVENTION

The present invention is in the field of devices for comminuting certain solid food materials. More specifically, it relates to cordless devices for grinding and milling coffee beans, spices and the like.

BACKGROUND OF THE INVENTION

A large variety of devices have been developed and are used in practicing the culinary art for grinding solid food stuffs. An advantage of such devices for use in the kitchen is to provide such food stuff, freshly ground, for preparing and seasoning foods. Such solid food materials which are desirable in a freshly ground condition include salt, pepper, coffee and certain other herbs and spices. The desirability of having these ingredients available in a freshly ground condition has long motivated the field to provide devices that are light-weight, handy and useful in different situations for different purposes.

Examples of devices for use in the home kitchen include salt and pepper dispensers which take rock salt or peppercorns and fresh grind them to smaller sized particles for seasoning foods. These dispensers vary in their design and operation and can be either manually or electrically operated. Sanders, U.S. Pat. No. 5,022,591 is an example of an electrically operated pepper mill suitable for use at tables for grinding whole peppercorns to provide fresh ground pepper. Tedioloi, U.S. Pat. No. 4,925,150 is a similar example of a combination electric grinder for both salt and pepper. Pai, U.S. Pat. No. 5,865,384, discloses a spice grinder that may be either electrically or manually operated. These devices have the added feature of being battery powered. An electrically operated pepper mill which is battery powered is certainly more handy than such a device having a power cord attached to it.

Unfortunately, conventional batteries have the disadvantage of requiring relatively frequent replacement. To address this disadvantage, small electrical devices often utilize rechargeable batteries as their power source. Rechargeable batteries require less frequent replacement. Typically, the batteries are recharged by storing the device in a charging stand or holder which is connected to a conventional household power source. The charging stand provides the electrical energy for recharging the device's batteries. Such rechargeable small appliances are known and commercially available. Dantis, U.S. Pat. No. 5,075,615 is an example of a combined recharging unit and stand for rechargeable electric razors. The Dantis device plugs directly into a conventional household electrical power outlet. By plugging directly into a power outlet, the Dantis device avoids the need for a power cord, and problem of storing or otherwise dealing with a length of cord. However, although plugging directly into a power outlet, as does the Dantis device, may be convenient for an electric razor, it is generally not suitable for larger and heavier appliances.

Gantz, et. al., U.S. Pat. No. 4,225,814 is an example of a system for storing and recharging a cordless vacuum cleaner. In Gantz, a storage cradle holds the battery powered handheld vacuum, and is connected by a power cord to an electrical outlet. The cradle contains electrical contacts which mate with the vacuum when it is stored in the cradle to provide the electrical energy to recharge the vacuum's batteries. However, the Gantz device has a power cord, the excess length of which must be stored or otherwise dealt with.

The KRUPS Type 208 HOUSEHOLD COFFEE MILL is an example of a commercially available, small electric kitchen appliance for providing freshly ground coffee beans. Power is provided to the KRUPS device via an attached electrical cord plugged into a conventional electrical outlet. Although useful for its intended purpose, the length of the attached power cord is a feature that must be dealt with when it is desired to leave the device available on a counter top. Other examples of similar devices for grinding coffee beans include Mayer et. al., U.S. Pat. No. 4,101,082 and Noguchi et. al., U.S. Pat. No. 4,469,283. These devices all have in common the use of a spinning blade that minces the beans to provide the fresh ground coffee. Generally, the blade type coffee grinders produce grounds of varying particle sizes, which may not be desirable.

Mill-type grinders which comminute the coffee beans have the advantage of better control over particle size than blade grinders. The field has been motivated to provide such mill-type grinders for household use. For example, Midden, U.S. Pat. Nos. 5,172,868 and 5,201,474 discloses a counter top electrical appliance for grinding coffee beans. The Midden device is a relatively large apparatus with the capacity to hold and grind a relatively large volume of coffee beans. Hurber, et. al. also describes a mill-type grinder that is a dual chamber coffee mill for separately containing beans in different hoppers. The TYPE 166 Coffee-grinder (produced by Solis, A. G., Switzerland) is an example of a commercially available, small electric kitchen appliance for providing fresh ground coffee beans which uses a mill-type grinder mechanism. However, electrical power is provided to the TYPE 166 device via an attached electrical cord plugged into a conventional electrical outlet. Although these devices may be useful for their intended purposes, the length of attached power cord is a feature that must be dealt with when it is desired to leave the device available on a counter top. Additionally, these devices are not easily portable nor adapted for hand use.

In view of the above, it would be useful in the field to have an alternative mill-type grinder device for coffee bean and similar food stuffs that is both portable and cordless, and adapted for hand use.

SUMMARY OF THE INVENTION

The present invention comprises a rechargeable grinder or mill unit and a cordless charging station. The present apparatus is useful for comminuting solid, particulate food stuffs like coffee beans, spices and condiments. The grinder or mill unit is electrically powered, utilizing a self-contained power source, and is portable by hand. The apparatus includes a cordless electrical charging station to provide energy to the self-contained electric power source of the mill. The mill or grinder is connectable to the charging station to charge the power source of the grinder/mill. Optionally, the grinder can be operated in place while so connected, or may be removed from the charging unit and operated separately.

The charging station comprises a base or cradle for releaseably receiving the grinder/mill, and a vertical tower component for connecting the charging station to a household electrical outlet The charging station includes an electrical probe connection for electrically communicating with the grinder (mill) when the grinder is received in the cradle or base of the charging station. An electrical circuit associated with the charging station provides the electrical power to the electrical probe connection from a household electric power source such as a typical household electrical outlet. The vertical tower component of the charging station is integral with a side of the base or cradle. The tower includes an electrical plug that connects the electrical circuit of the charging station to a household power source. The tower provides a structure having an adjustable means for connecting the cradle to a household power outlet at a range of different heights from the flat surface on which the cradle is supported. This configuration permits the charging station to be substantially flush against the wall on a counter top, without having a length of power cord loose on the counter, or which must be dealt with in some other fashion.

The components of the tower may be configured in a vertical sliding relationship to provide a height adjustment feature. This may be accomplished by having the structure of the tower be telescoping to enable the electrical plug to mate with the household electrical outlet at different heights from the base of the charging station. Alternatively, the vertically adjustable feature of the charging station can be accomplished by having the electrical plug moveably disposed in the tower so that the plug can be set to protrude from the tower at different heights relative to the base of the charging station. This also permits the insertion of the plug into an electrical outlet at different heights above the counter top or other supporting surface.

The electrical connection between the charging station and the grinder is an inductive-type of connection. An induction probe is electrically associated with the charging station's electrical circuit, and disposed on the charging unit so as to interface with a complementary induction probe receptacle disposed on the mill/grinder.

Alternatively, the mill or grinder of the present invention comprises a burr-type grinding mechanism, rather that a spinning blade. A burr-type mill/grinder unit is similar to the blade grinder described above, having a similar hollow body portion or housing with a generally vertical orientation and a vertical axis. The housing has a closed bottom end or base end and an open top end. A basket is disposed in the open top end of the housing for receiving and holding the food materials to be ground, such as coffee beans, peppercorns and the like. The bottom of the basket has an aperture opening through it. The aperture opens into a through passage that serially communicates first with a milling mechanism and then with a drop chamber. The passage leads from the opening in the bottom of the basket into the grinding space of a milling mechanism, through the grinding space and into a drop chamber. The drop chamber contains or leads to a receptacle for receiving the processed (ground) foodstuffs.

The milling mechanism is a burr-type grinding assembly having a non-rotating grinding element and a rotating grinding element. The rotating grinding element is connected to an electric motor. A grinding space is disposed between the two grinding elements, the grinding space being a section of the through passage. The milling mechanism is positioned proximate the bottom of the basket to receive the particulate food materials as they pass through the aperture in the bottom of the basket and into the grinding space.

The non-rotating element of the milling mechanism is positionable relative to the rotating grinding element, so as to enable the selectable adjustment of the volume or closeness of the grinding space. Means for accomplishing the selectable adjustment of the closeness of the grinding space are known to and practicable in the present invention by one of ordinary skill in the art. This can be accomplished by having the non-rotating element of the milling mechanism fixed to the bottom of the basket, and having the basket be selectively positionable at various depths in the open end of the housing. This configuration of the basket and non-rotating grinding element enables a user of the grinder to position the non-rotating element relative to the rotating grinding element to adjust the volume of the grinding space, and thence the coarseness or fineness of the comminuted materials. The depth of the basket in the open end of the housing can be set by having the lid be screwable into the housing against the upper edge of the basket. The basket in this case, is biased against the action of the movement of the lid into the open end of the housing. The volume of the grinding space is then adjusted by twisting the lid in one direction or another to adjust the depth the lid. Hence, the basket is set into the open end of the housing at different depths, so as to position the non-rotating element relative to the rotating grinding element. Typically, the electric motor which drives the rotating grinding element is connected to the milling mechanism from below the milling mechanism.

The drop chamber is disposed below the milling mechanism to receive by gravity and the action of the milling mechanism the ground food materials after they have passed through the grinding space section of the through passage. A baffle may be included to facilitate directing the processed foodstuffs into the drop chamber. A removable drop bin is disposed within the drop chamber for catching the ground food materials as they fall from the through passage.

The electric motor that operates the rotating grinding element is powered by a rechargeable power supply contained within the housing. The rechargeable power supply is in electrical communication with the grinding motor and provides and controls the electricity that operates the motor. Typically, the rechargeable power supply is a battery or battery pack, such as is known in the art and used for such purposes.

The portable grinder has a removable lid which covers the open end of the housing. The removable lid can have graduated markings on the lid to indicate different volumes containable in the lid. A desired amount of food stuffs, such as coffee beans, may be measured in the lid and then transferred into the basket of the grinder/mill to be processed. The lid for the grinder may also have a cover of its own to permit sealed storage of the ground materials in the lid, separated from the grinder housing.

DETAILED DESCRIPTION OF THE INVENTION

Figure 1:
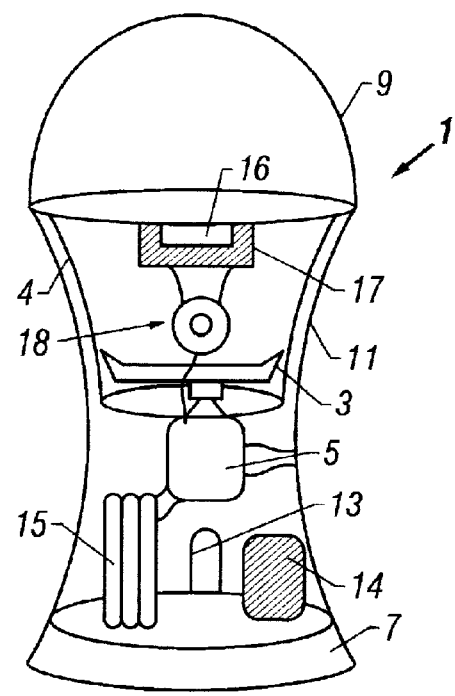
FIG. 1 is a side perspective view of the grinder used in the present invention with the lower front wall removed to show the interior contents.

Referring now to the drawings, the details of preferred embodiments of the present invention are graphically and schematically illustrated. Like elements in the drawings will be represented by like numbers, and any similar elements will be represented by like numbers with a different lower case letter suffix.

The present invention is an apparatus useful for comminuting solid, particulate food stuffs like coffee beans, spices and condiments, and comprises a rechargeable grinder or mill unit and a cordless charging station. The grinder or mill unit is electrically powered, utilizing a self-contained power source, and is portable by hand. The electrical charging station is cordless and utilizes an inductive coupling to the grinder unit to provide energy to the grinder's self-contained electric power source.

FIG. 1 is a side perspective view of a preferred embodiment of the grinder 1 of the present invention, with the facing wall of the grinder's body or housing 11 removed to show the contents of the interior of the grinder's housing 11. As shown, the housing contains a spinning blade mechanism 3 that is located in a grinding basket 4. An electric motor 5, fixed to the interior wall of the grinder housing 11, is operatively associated with and connected to the blade 3 to cause the blade to spin when electrical power is supplied to the motor 5. Preferably, the motor 5 is a low voltage direct current motor such as is known and used in the art for powering small tools and appliances. Proximate the bottom 7 of the grinder 1 is an induction probe receptacle 13 for receiving an induction probe 32, a recharging circuit 14 and a battery pack 15. The induction probe receptacle 13 is located near the bottom 7 of the housing 11 and is adapted to receive the induction probe 32 (see FIG. 2) from the charging station 25 to enter the grinder housing 11 and induce an electric current in the charging circuit 14.

At the top of the grinder housing 11 is a hollow, removable lid 9 shown with its front wall in place. The lid 9 is mounted on the grinder body or housing 11 whose front wall is removed in this view. Coffee beans or other food products, like spices, that are to be ground by the spinning blade 3, are inserted into the basket 4 of the grinder 1 by removing the lid 9. Optionally, the removable lid 9 may include graduate marking to indicate different volumes containable in the hollow of the lid 9. A small safety tab 16 at the interface between the lid 9 and housing 11 may be used to permit easy removal of the lid and to actuate a safety switch 17. The safety tab 16 must engage the safety switch 17 to complete the electrical circuit from the power button switch 18 (located on the exterior surface of housing 11 and extending into the housing's interior) to the electrically operated motor 5. By removing the upper lid 9, coffee beans or other food products to be ground can be inserted into the grinding basket 4 that contains the blade 3. When the coffee beans or food products contact the spinning blade 3 they are ground into a powder. After grinding the food products to the desired consistency, the grinder 1 can then be turned upside down and the ground processed products will fall into the hollow of the lid 9.

Proximate the bottom 7 of the housing 11 an electric induction probe charging receptacle 13 is shown in this embodiment disposed on the wall of the housing 11. The probe receptacle 13 is electrically connected to the charging circuit 14 and to the rechargeable battery pack 15 by wires 12. The battery pack 15 is electrically connected by wires 12 to the safety switch 17 and power switch 1I and to the electric motor 5. See FIG. 6A. Normally, the motor 5 is powered by the battery pack 15 which is capable of being continuously charged by the charging circuit 14. There is no direct electrical contact between the motor 5 and an external power source. Induction type charging systems are known in the art and are readily practiced in the present invention by the ordinary skilled artisan. Examples of such induction type charging systems are commonly found on many electronic cordless toothbrushes commercially available at this time.

The grinding blade 3 can be a single or a multi-functional blade which can be used to grind up different food materials. Such multi-functional grinding blades are available on most food grinders commercially available today. A power button switch 18, shown mounted on the side of the housing 11, is connected by wires 12 to the motor 5 and the battery pack 15, which allows the external control of the motor 5 by a user.

Figure 2:
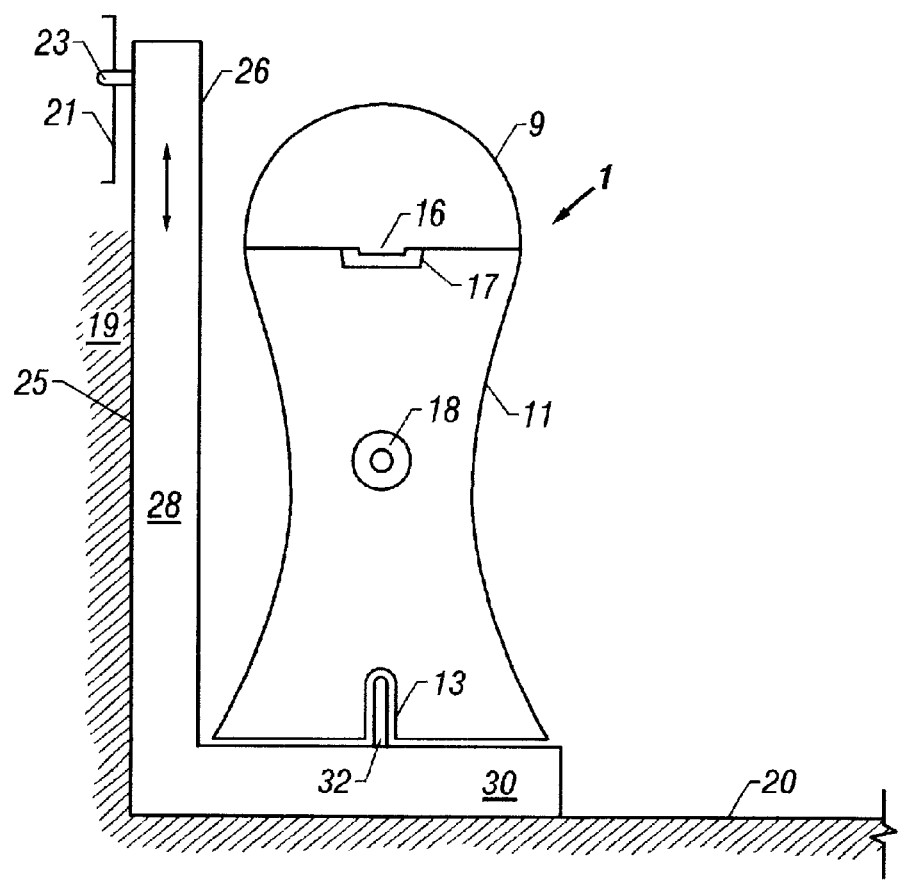
FIG. 2 is a side view shown the grinder mounted in a charging station on a kitchen counter.

FIG. 2 is a side view of the present invention showing present invention with the grinder 1 received on the base or cradle 30 of the charging station 25, and sitting on a supporting surface 20 (e.g., a kitchen counter) and connected to a wall outlet 21. The wall 19 has a conventional wall mounted electrical outlet 21 which mates with a utility plug 23 built into the charging station 25. The charging station 25 comprises a base or cradle 30 at the (back) side of which a tower 28 is attached. The tower 28 has an upper, vertically adjustable component 26, which includes the utility plug 23 which is connectable to the household power source 21. The vertically adjustable component 26 is mounted on the tower 28 to permit adjusting the vertical height of the plug 23 to accommodate wall plug outlets 21 located at different heights above the supporting surface 20.

Figure 4:
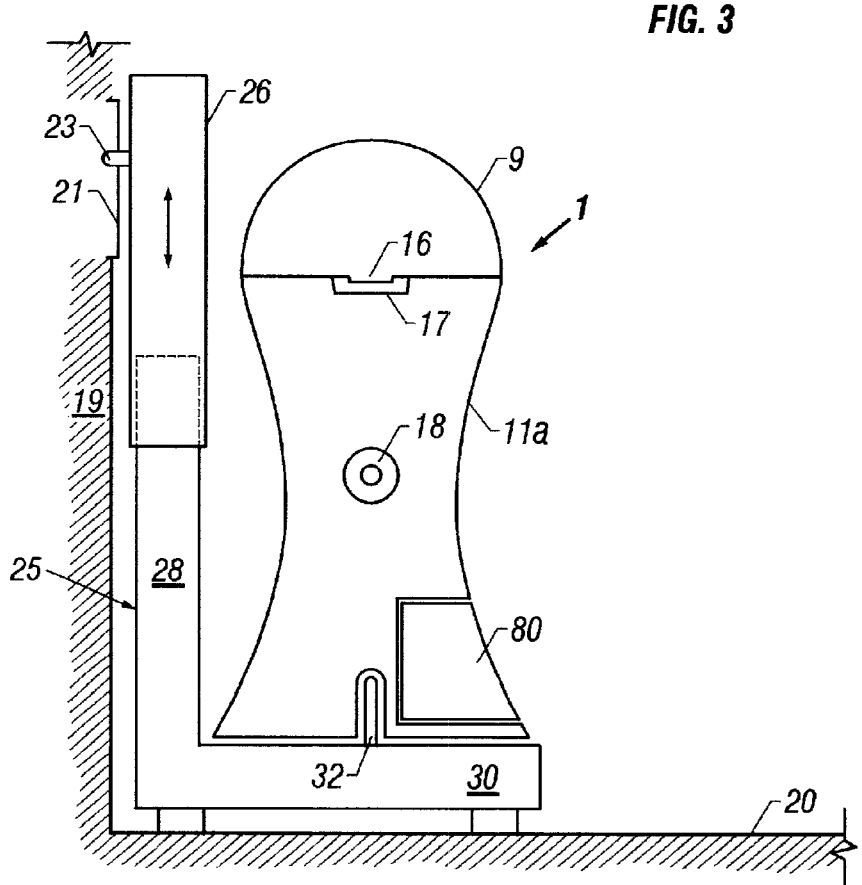
FIG. 4 is a side elevation view of the present invention showing a grinder received on the base or cradle of a charging station, and the tower of the charging station having a telescoping height adjustment section with its plug inserted into a household electrical outlet.

A telescoping mount of the two components 26 & 28 may be used for this purpose with appropriate stops to fix the plug 23 of the upper vertically adjustable component 26 at a desired height relative to the supporting surface 20 and station's base 30 (see FIG. 4). Alternatively, the side tower 28 can include the electrical plug 23 being in a vertically sliding or other vertically movable relationship with the tower 28 for mating with the household power outlet 21 at a range of different heights from the support surface 20. Internal wires conduct electricity from the plug 23 to the charging probe 32, shown inserted into the probe receptacle 13 in the of the housing 11. When the charging probe 32 is received properly into probe receptacle 13 of the grinder 1, electric charge is induced in the grinder's charging circuit 14. This charge supplies electrical power to the grinder's batteries 15 and to the motor 5 used to turn the blades 3.

No wires directly connect the charging probe receptacle 13 to the station's charging probe 32. The only direct electrical contact to the charging station 25 is between the plug 23 of the vertically adjustable component 26 and the wall outlet 21. Utilizing induction charging eliminates the possibility of dirty electrical contacts between the grinder 1 and the charging station 25 and the risk of shorting such electrical contacts.

In use, the user places the material to be ground in the basket 4 by first removing the lid 9, inserting the material and then replacing the lid 9. In oneembodiment of the invention, the material to be ground was less than one ounce and could be up to a total of three ounces. When in an upright position as shown, the material to be ground, like coffee beans, stays in the basket 4 and is ground by the spinning grinding blade 3. Blade 3 is actuated to spin by depressing external button 18 to supply energy to grind the beans. Once fully ground, the grinding unit 1 is turned off and placed in an upside down position from that shown in the two figures and the ground products are deposited by gravity into the holding hollow lid 9. This detachable storage lid 9 may then be removed from the body 11 of the grinder and its ground bean contents transported and used to make coffee in a coffee maker. A similar method would be used to grind and store other processed food products.

Figure 3:
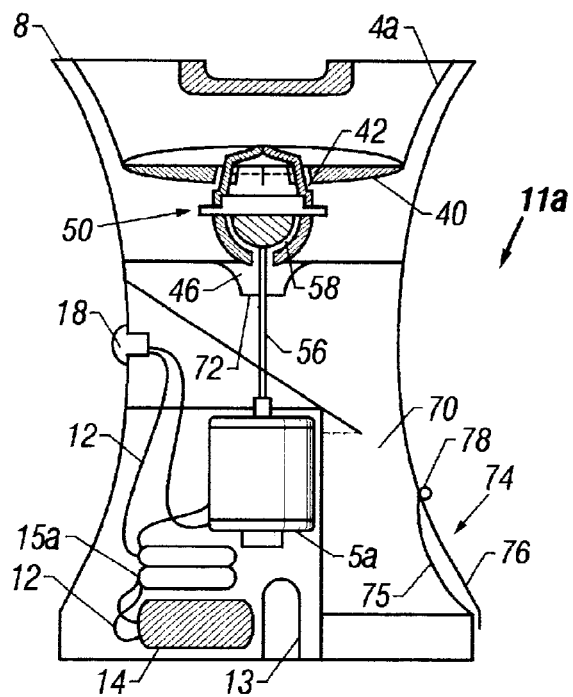
FIG. 3 is a partial cross-sectional view of the housing of the present grinder having a burr-type grinding mechanism.

In the preferred embodiment exemplified in FIG. 3, the present invention is an apparatus for grinding solid particulate food materials comprising the housing 11a of the portable grinder 1 having an electric grinding motor 5 powered by a rechargeable power source 15a, and an electrical connection 13 for electrically communicating with the charging station 25 when the grinder is received in the charging station 25. The housing 11a in this embodiment has a generally vertical orientation and a vertical axis, with a closed base end 7 and an open top end 8. A basket 4a is disposed in the open top end 8 of the housing 11a for receiving the food materials to be processed (ground). The basket 4a has a bottom 40 with an aperture 42 opening into a through passage 46 communicating serially with a milling mechanism 50 and a drop chamber 70.

Figure 5:
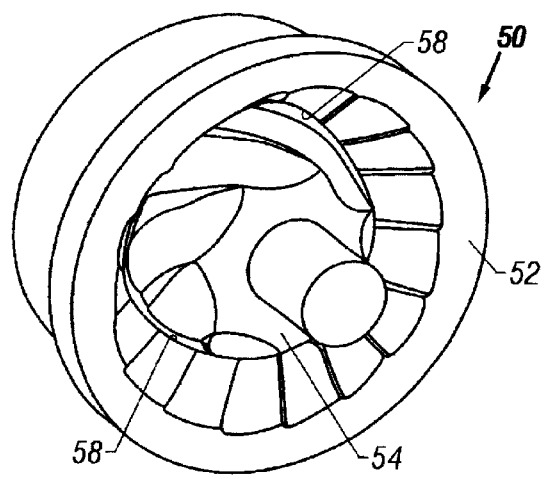
FIG. 5 is a perspective view of a burr-type grinding mechanism showing the fixed and the rotary components of the grinding assembly.

The milling mechanism 50, see FIG. 5, is a burr-type grinder assembly having a non-rotating grinding element 52 and a rotating grinding burr 54 grinding element. The rotating grinding burr 54 is connected by a shaft 56 to the grinding motor 5. A grinding space 58 is disposed between the two grinding elements 52 & 54, the grinding space 58 being a section of the through passage 46. The non-rotating grinding element 52 is adjustable relative to the rotating burr 54 enabling the user of the grinder 1a to adjust the configuration of the grinding space 58 and control the resultant particulate size of the processed foodstuff. The milling mechanism 50 positioned at the bottom 40 of the basket 4a to receive the unprocessed particulate foodstuff as they pass through the bottom of the basket 4a. In the preferred embodiment shown in FIG. 3, the grinding motor 5a is mounted connected to the rotating grinding burr 54 from below the milling mechanism 50. Alternatively, the motor 5a could be mounted above the grinding mechanism 50 and connected to the grinding burr 54.

In a preferred embodiment, adjustment of the grinding space 58 is accomplished by having the non-rotating grinding element 52 of the milling mechanism 50 is fixed to the bottom of the basket 4a. In this case, the basket 4a is selectively positionable at a depth in the open end 8 of the housing 11a so as to position the non-rotating element relative to the rotating grinding element to adjust the volume of the grinding space 58. The basket 4a is selectively positionable at different depths into the open end 8 of the housing 11a by having the lid 9 press the basket 4a to the selected depth. This may be accomplished by having the lid 9 threadably engage the open end 8 of the housing 11a. Thus, when the lid 9 is twisted to thread it onto the housing 11a, the depth that the lid 9 is threaded into the open end 8 of the housing set the depth of the basket 42 in the open end 8, and hence, the volume of the grinding space 58. Twisting the lid 9 in one direction or another adjusts the depth the basket 4a is set into the open end 8 of the housing 11a, and positions the non-rotating element 52 relative to the rotating burr 54 to adjust the volume of the grinding space 58. Other means for adjusting the grinding space are known to the ordinary skilled artisan and readily practicable in the present invention. For example, see the grind adjustment means on the KRUPS Type 208 HOUSEHOLD COFFEE MILL mentioned above.

A drop chamber 70 is disposed below the milling mechanism 50 to receive by gravity processed (ground) materials passing from the milling mechanism 50. A baffle 72 may be used to facilitate directing the processed materials as they exit from the grinding space 58 of the grinding mechanism 50. In a preferred embodiment, the baffle 72 is flexible and contacts the non-rotating element 52 proximate the grinding space 58 where the processed materials exit the grinding mechanism 50. The flexible baffle 72 can then move as the non-rotating element 52 is adjusted. The ground materials then collect in the drop chamber 70. The ground or processed materials may be removed from the chamber through a covered port 74 comprising an opening 75 in the wall of the housing 11a covered by a hatch 76 and hinge 78 assembly as shown in the figure, or by other covering means as known to and practicable in the present invention by one of ordinary skill in the art. Alternatively, as shown in FIG. 4., a removable container 80 is disposed within the drop chamber 70 for catching the ground food materials.

Figure 6A:
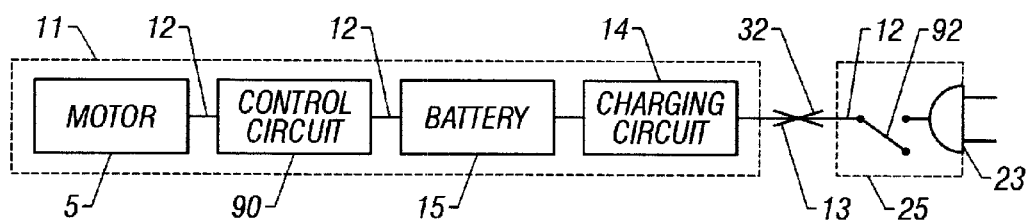
FIG. 6A is a block schematic diagram of the electrical components of the present invention showing the charging circuit incorporated into the grinder.

As shown in FIG. 6A, the electrical components of the preferred embodiment of the present invention are distributed between the charging station 25 and the grinder housing 11. The charging station 25 includes an electrical plug 23 for mating with a household electrical outlet 21. Wires 12 connect the plug 23 to the induction probe 32, and other wires 12 connect the other electrical components in the present device as shown. In a preferred embodiment utilizing induction charging, the charging circuit 14 is disposed in the housing 11. When the housing 11 of the grinder 1 is received in the charging station 25 as electrically depicted in FIG. 6A, electrical energy is induced in the probe receptacle 13 by the induction probe 32. The charging circuit 14 receives the induced electrical energy from the induction probe receptacle 13 and stores it in the chargeable power supply or battery pack 15. A purpose of the charging circuit is to receive electrical energy and to condition as appropriate for charging the power supply. The power supply 15 then provides electrical energy to the motor 5 by way of the control circuit 90. Control circuit 90 is the combination of the motor power switch 18 and any other electrical power interrupt feature, such as safety switch 17, incorporated between the power supply 15 and the motor 5. Additionally, a main on/off switch 92 (shown in the off position in FIG. 6A, and in the on position in FIG. 6B) for the device of the present invention may optionally be incorporated into the charging station.

Figure 6B:
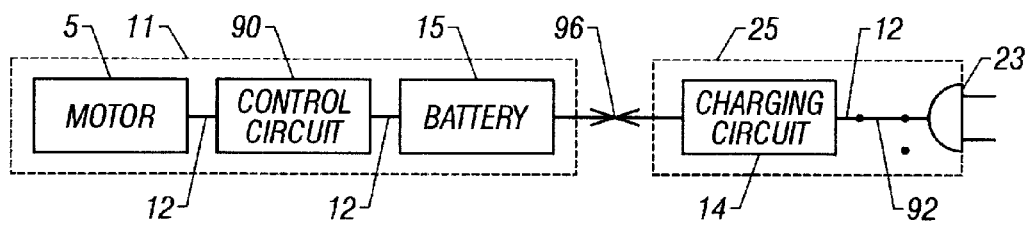
FIG. 6B is a block schematic diagram of the electrical components of the present invention showing the charging circuit incorporated into the charging station.

Alternatively, if it is desired to not use inductive coupling of electrical energy to charge the power supply, the electrical components of the present invention may be configured as shown in FIG. 6B. In this case, the charging circuit 14 is incorporated into the charging station 25, and the electrical connection 96 is a typical conductor-to-conductor connection as is known in the art. This embodiment still includes the benefits of having a hand portable, rechargeable grinder 1 and a cordless charging station.

While the above description contains many specifics, these should not be construed as limitations on the scope of the invention, but rather as exemplifications of one or another preferred embodiment thereof. Many other variation are possible, which would be obvious to one skilled in the art. Accordingly, the scope of the invention should be determined by the scope of the appended claims and their equivalents, and not just by the embodiments.

What is claimed is:

1. An apparatus for grinding solid particulate food materials comprising:

a portable grinder having an electric grinding motor powered by a rechargeable power source and charging circuit, the grinder being removably mountable on a charging station, wherein the portable grinder further comprises:

a housing having generally vertical orientation and a vertical axis, with a closed base end and an open top end, a basket disposed in the open top end of the housing for receiving the food materials to be ground, the basket having a bottom with an aperture opening into a through passage communicating serially with a milling mechanism and a drop chamber, the milling mechanism including a burr grinder assembly having a non-rotating grinding element and a rotating grinding element connected to the grinding motor and a grinding space disposed between the two grinding elements, the grinding space being a section of the through passage, and the milling mechanism positioned proximate the bottom of the basket to receive the particulate food materials as they pass through the bottom of the basket, the drop chamber disposed below the milling mechanism to receive by gravity ground food materials after they have passed through the milling mechanism, a removable drop bin disposed within the drop chamber for catching the ground food materials, and the rechargeable power supply in electrical communication with the grinding motor to operate the motor;

the charging station being mountable on a flat surface and having a cradle for releaseably receiving the grinder and having an electrical circuit connectable to a household electric power source; and an electrical connection for electrically coupling electrical circuit of the charging station to the charging circuit of the grinder when the grinder is received in the cradle.

2. The portable grinder of claim 1, further comprising a removable lid for covering the open end of the housing.

3. The removable lid of claim 2 having graduate marking on the lid to indicate different volumes containable in the lid.

4. The portable grinder of claim 1, wherein the non-rotating element of the milling mechanism is positionable relative to the rotating grinding element, so as to selectively adjust the volume of the grinding space.

5. The portable grinder of claim 1, wherein the non-rotating element of the milling mechanism is fixed to the bottom of the basket, and the basket is selectively positionable at a depth in the open end of the housing so as to position the non-rotating element relative to the rotating grinding element to adjust the volume of the grinding space.

6. The portable grinder of claim 1, wherein the non-rotating element of the milling mechanism is fixed to the bottom of the basket, and the basket is selectively positionable at a depth in the open end of the housing by twisting the lid in one direction or another to adjust the depth the basket is set into the open end of the lid, so as to position the non-rotating element relative to the rotating grinding element to adjust the volume of the grinding space.

7. The portable grinder of claim 1, wherein the milling mechanism has the rotating grinding element connected to the grinding motor from below the milling mechanism.

8. The portable grinder of claim 1, wherein the milling mechanism has the rotating grinding element connected to the grinding motor from above the milling mechanism.

9. The apparatus of claim 1 wherein the charging station further comprises a side tower integral with a side of the cradle, the tower containing a part of the electrical circuit that is connectable to the household power source.

10. The charging station of claim 9 wherein the side tower further comprises an electrical plug, and the electrical plug being in a vertical sliding relationship with the tower for mating with the household power source at a range of different heights from the flat surface.

11. The charging station of claim 9 comprising the side tower having at least one upper section in telescoping relationship the top of the tower, the upper section having an electrical plug for mating with the household power source at a range of different heights from the flat surface.

12. The apparatus of claim 1, wherein the electrical connection for electrically coupling the electrical circuit of the charging station to the charging circuit of the grinder is an inductive connection comprising an induction probe and an induction probe receptacle.

13. The apparatus of claim 1, wherein the charging circuit is located in the charging station, and the electrical connection for electrically coupling the charging station to the grinder is a conductor-to-conductor connection.

* * * * *